US011451367B1

(12) United States Patent
Oveis Gharan et al.

(10) Patent No.: US 11,451,367 B1
(45) Date of Patent: Sep. 20, 2022

(54) TECHNIQUES FOR ENHANCED CLOCK RECOVERY

(71) Applicants: Shahab Oveis Gharan, Ottawa (CA); James St. Leger Harley, Richmond (CA); Tung Trong Nguyen, Kanata (CA)

(72) Inventors: Shahab Oveis Gharan, Ottawa (CA); James St. Leger Harley, Richmond (CA); Tung Trong Nguyen, Kanata (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 17/484,532

(22) Filed: Sep. 24, 2021

Related U.S. Application Data

(60) Provisional application No. 63/160,064, filed on Mar. 12, 2021.

(51) Int. Cl.
*H04L 7/00* (2006.01)
*H04L 25/00* (2006.01)
*H04L 25/40* (2006.01)
*H04L 7/02* (2006.01)

(52) U.S. Cl.
CPC .............. *H04L 7/0079* (2013.01); *H04L 7/02* (2013.01)

(58) Field of Classification Search
CPC ....... H04L 7/0079; H04L 7/02; H04L 7/0338; H04L 27/361; H04B 10/6165; H04B 10/697; H04B 10/508; H04B 10/63; H04J 14/06
USPC ................ 375/371, 373, 375, 376, 326, 327
See application file for complete search history.

(56) References Cited

U.S. PATENT DOCUMENTS

| 8,135,283 | B2 | | 3/2012 | Sun et al. | |
|---|---|---|---|---|---|
| 9,998,235 | B2 | * | 6/2018 | Zhou | H04B 10/697 |
| 10,439,732 | B2 | * | 10/2019 | Oyama | H04B 10/6165 |
| 10,873,493 | B2 | * | 12/2020 | Xu | H04L 27/361 |
| 10,938,483 | B1 | | 3/2021 | Babaee et al. | |
| 2006/0245766 | A1 | * | 11/2006 | Taylor | H04B 10/63 398/208 |
| 2006/0285855 | A1 | * | 12/2006 | Sun | H04B 10/508 398/155 |
| 2012/0155890 | A1 | * | 6/2012 | Zhou | H04B 10/6165 398/208 |

(Continued)

*Primary Examiner* — Phuong Phu
(74) *Attorney, Agent, or Firm* — Integral Intellectual Property Inc.; Amy Scouten; Miriam Paton

(57) ABSTRACT

A receiver generates a stream of digital samples from an analog electrical signal that represents data conveyed to the receiver over a communication channel, where the stream of digital samples comprises current samples corresponding to a current timepoint, previous samples corresponding to a timepoint earlier than the current timepoint, and subsequent samples corresponding to a timepoint later than the current timepoint. The receiver generates previous, current, and subsequent phase offset signals based on the previous, current, and subsequent samples, respectively. The receiver uses the previous phase offset signal to adjust clock frequency and clock phase of the current samples, thereby resulting in current adjusted samples. The receiver adjusts clock phase of the current adjusted samples based on any one of the previous, current, and subsequent phase offset signals. In some examples, receiver adjusts the clock phase of the current adjusted samples based on the subsequent phase offset signal.

20 Claims, 9 Drawing Sheets

(56) References Cited

U.S. PATENT DOCUMENTS

2012/0170697 A1\* 7/2012 Hsu ...................... H04L 7/0338
375/376
2017/0005734 A1\* 1/2017 Oveis Gharan .... H04B 10/6165
2020/0235842 A1\* 7/2020 Jia .......................... H04J 14/06

\* cited by examiner

TECHNIQUES FOR ENHANCED CLOCK RECOVERY

CROSS-REFERENCE

This application claims the benefit of U.S. Patent Application Ser. No. 63/160,064 filed Mar. 12, 2021, the entire contents of which are incorporated herein by reference.

TECHNICAL FIELD

This document relates to the technical field of communications.

BACKGROUND

In a communication network, a transmitter may transmit a signal over a communication channel to a receiver, where the signal is representative of digital information in the form of symbols or bits. The receiver may process the signal received over the communication channel to recover estimates of the symbols or bits. Various components of the communication network may contribute to signal degradation, such that the signal received at the receiver comprises a degraded version of the signal that was generated at the transmitter. In the case of an optical communication network, degradation or distortion may be caused by chromatic dispersion (CD), polarization mode dispersion (PMD), polarization dependent loss (PDL), and amplified spontaneous emission (ASE).

The signal generated at the transmitter may be representative of a stream of symbols to be transmitted at a regular cadence according to times set by a symbol clock, where the frequency of the symbol clock is referred to as the symbol frequency or symbol rate or baud rate. At the receiver, estimates of the symbols may be recovered by sampling the received signal at times set by a sample clock, where the frequency of the sample clock is referred to as the sample frequency or sample rate. The accuracy of the symbol estimates depends on the precise timing of the samples in relation to the timing of the symbols in the received signal. Clock phase noise may result in jitter on the sample times relative to the symbol times, which in turn may reduce accuracy of the symbol estimates. The ability to achieve optimum sample timing at the receiver involves a process referred to as clock recovery or timing recovery.

SUMMARY

In a broad aspect, a receiver apparatus comprises circuitry configured to generate a stream of digital samples from an analog electrical signal, where the analog electrical signal is representative of data conveyed to the receiver apparatus over a communication channel, where the stream of digital samples comprises current digital samples corresponding to a current timepoint, previous digital samples corresponding to a timepoint earlier than the current timepoint, and subsequent digital samples corresponding to a timepoint later than the current timepoint; circuitry configured to generate previous, current, and subsequent phase offset signals based on the previous, current, and subsequent digital samples, respectively; circuitry configured to use the previous phase offset signal to adjust clock frequency and clock phase of the current digital samples, thereby resulting in current adjusted samples; and circuitry configured to adjust clock phase of the current adjusted samples based on any one of the previous, current, and subsequent phase offset signals.

According to some examples, the clock phase of the current adjusted samples is adjusted based on the subsequent phase offset signal.

According to some examples, the receiver apparatus comprises circuitry configured to generate previous, current, and subsequent compensated samples from the previous, current, and subsequent digital samples, respectively, wherein the previous, current, and subsequent compensated samples are at least partially compensated for chromatic dispersion in the communication channel, and wherein the previous, current, and subsequent phase offset signals are generated using the previous, current, and subsequent compensated samples, respectively.

According to some examples, the receiver apparatus comprises circuitry configured to suppress tones in the current phase offset signal prior to using the current phase offset signal to adjust the clock phase of the previous digital samples, wherein the tones are associated with one or more fundamental frequencies.

According to some examples, the current phase offset signal comprises first tones originating from the receiver at one of the fundamental frequencies, and the current phase offset signal comprises second tones originating from outside the receiver at another one of the fundamental frequencies.

According to some examples, the receiver apparatus comprises circuitry configured to apply a lowpass filter to the current phase offset signal to generate a filtered current phase offset signal; circuitry configured to calculate a first difference signal by subtracting the filtered current phase offset signal from the previous phase offset signal; and circuitry configured to adjust the clock phase of the previous digital samples based on the first difference signal.

According to some examples, the receiver apparatus comprises circuitry configured to apply a notch filter to the first difference signal, thereby generating a notched difference signal; circuitry configured to calculate a second difference signal by subtracting the notched difference signal from the previous phase offset signal; and circuitry configured to adjust the clock phase of the previous digital samples based on the second difference signal.

According to some examples, the notch filter comprises a comb filter configured to suppress harmonics of one or more fundamental frequencies.

According to some examples, the receiver apparatus comprises circuitry configured to buffer the previous digital samples for a period of time prior to adjusting the clock phase of the previous digital samples based on the current phase offset signal.

According to some examples, the period of time matches a sum of a first time delay associated with generating the current phase offset signal based on the current digital samples, and a second time delay associated with applying a lowpass filter to the current phase offset signal.

DETAILED DESCRIPTION

Figure 1:
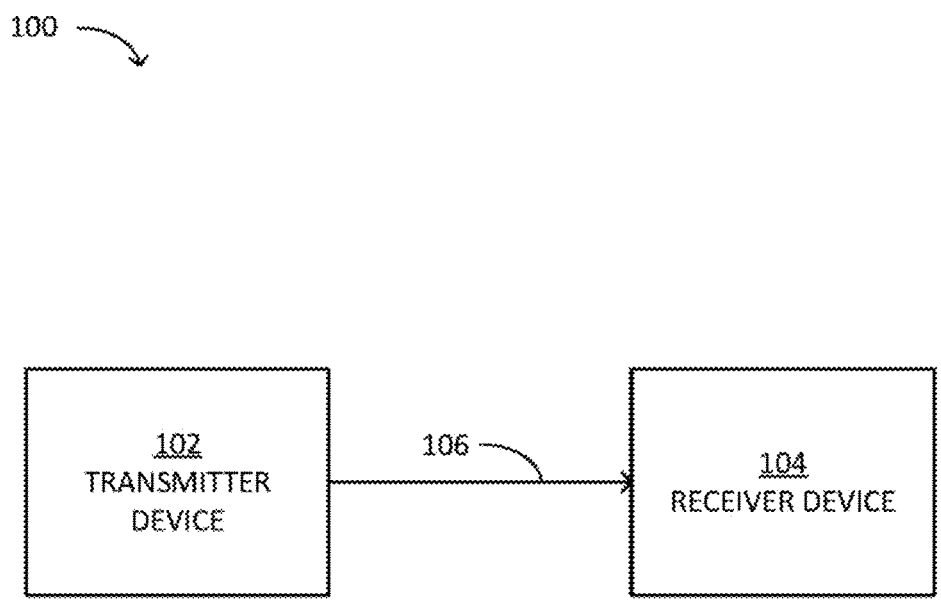
FIG. 1 illustrates an example communication network in accordance with some examples of the technology disclosed herein.

FIG. 1 illustrates an example communication network 100, in accordance with some examples of the technology disclosed herein.

The communication network 100 may comprise at least one transmitter device 102 and at least one receiver device 104, where the transmitter device 102 is capable of transmitting signals over a communication channel, such as a communication channel 106, and where the receiver device 104 is capable of receiving signals over a communication channel, such as the communication channel 106. According to some examples, the transmitter device 102 is also capable of receiving signals. According to some examples, the receiver device 104 is also capable of transmitting signals. Thus, one or both of the transmitter device 102 and the receiver device 104 may be capable of acting as a transceiver. According to one example, the transceiver may comprise a modem.

The communication network 100 may comprise additional elements not illustrated in FIG. 1. For example, the communication network 100 may comprise one or more additional transmitter devices, one or more additional receiver devices, and one or more other devices or elements involved in the communication of signals in the communication network 100.

According to some examples, the signals that are transmitted and received in the communication network 100 may comprise any combination of electrical signals, optical signals, and wireless signals. For example, the transmitter device 102 may comprise a first optical transceiver, the receiver device 104 may comprise a second optical transceiver, and the communication channel 106 may comprise an optical communication channel. According to one example, one or both of the first optical transceiver and the second optical transceiver may comprise a coherent modem.

Each optical communication channel in the communication network 100 may include one or more links, where each link may comprise one or more spans, and each span may comprise a length of optical fiber and one or more optical amplifiers.

Where the communication network 100 involves the transmission of optical signals, the communication network 100 may comprise additional optical elements not illustrated in FIG. 1, such as wavelength selective switches, optical multiplexers, optical de-multiplexers, optical filters, and the like.

Various elements and effects in the communication network 100 may result in the degradation of signals transmitted between different devices. Thus, a signal received at the receiver device 104 may comprise a degraded version of a signal transmitted by the transmitter device 102, where the degradation is caused by various impairments in the communication channel 106. For example, where the communication channel 106 is an optical communication channel, the signal transmitted by the transmitter device 102 may be degraded by polarization mode dispersion (PMD), polarization dependent loss or gain (PDL or PDG), state of polarization (SOP) rotation, amplified spontaneous emission (ASE) noise, and wavelength-dependent dispersion or chromatic dispersion (CD), nonlinear noise from propagation through fiber, and other effects. The degree of signal degradation may be characterized by a signal-to-noise ratio (SNR), or alternatively by a noise-to-signal ratio (NSR). The signals transmitted in the communication network 100 may be representative of digital information in the form of bits or symbols. The probability that bit estimates recovered at a receiver differ from the original bits encoded at a transmitter may be characterized by the Bit Error Ratio (BER). As the noise power increases relative to the signal power, the BER may also increase.

The receiver device 104 may receive a communication signal transmitted over the communication channel 106 from the transmitter device 102, where the communication signal conveys symbols that are representative of digital information. A stream of symbols may be transmitted at times set by a transmitter symbol clock, where the frequency of the symbol clock is referred to as the symbol frequency, or symbol rate, or baud rate, and is equivalent to $1/T_S$, where $T_S$ denotes the symbol period. At the receiver device 104, estimates of the symbols may be recovered by sampling the received signal at times set by a receiver sample clock, where the frequency of the sample clock is referred to as the sample frequency or sample rate. The sample rate may be selected to satisfy the Nyquist criterion for the highest anticipated symbol rate. For example, if the transmitter symbol rate is expected to be 10 GBaud, then the receiver sample rate may be set to 20 GHz. The decoded symbols that are recovered from the received signal may comprise noisy versions of the symbols that were originally transmitted by the transmitter device 102.

In order to avoid inter-symbol interference (ISI), the optical signal transmitted from the transmitter device 102 to the receiver device 104 may be designed to satisfy the Nyquist criterion for zero ISI. A variety of filters may be used to satisfy this criterion. One example is a raised cosine filter, which produces a bandwidth of $$\frac{1+\alpha}{T_S},$$

where α denotes a roll-off factor which is a real number satisfying 0<α<1.

Figure 2:
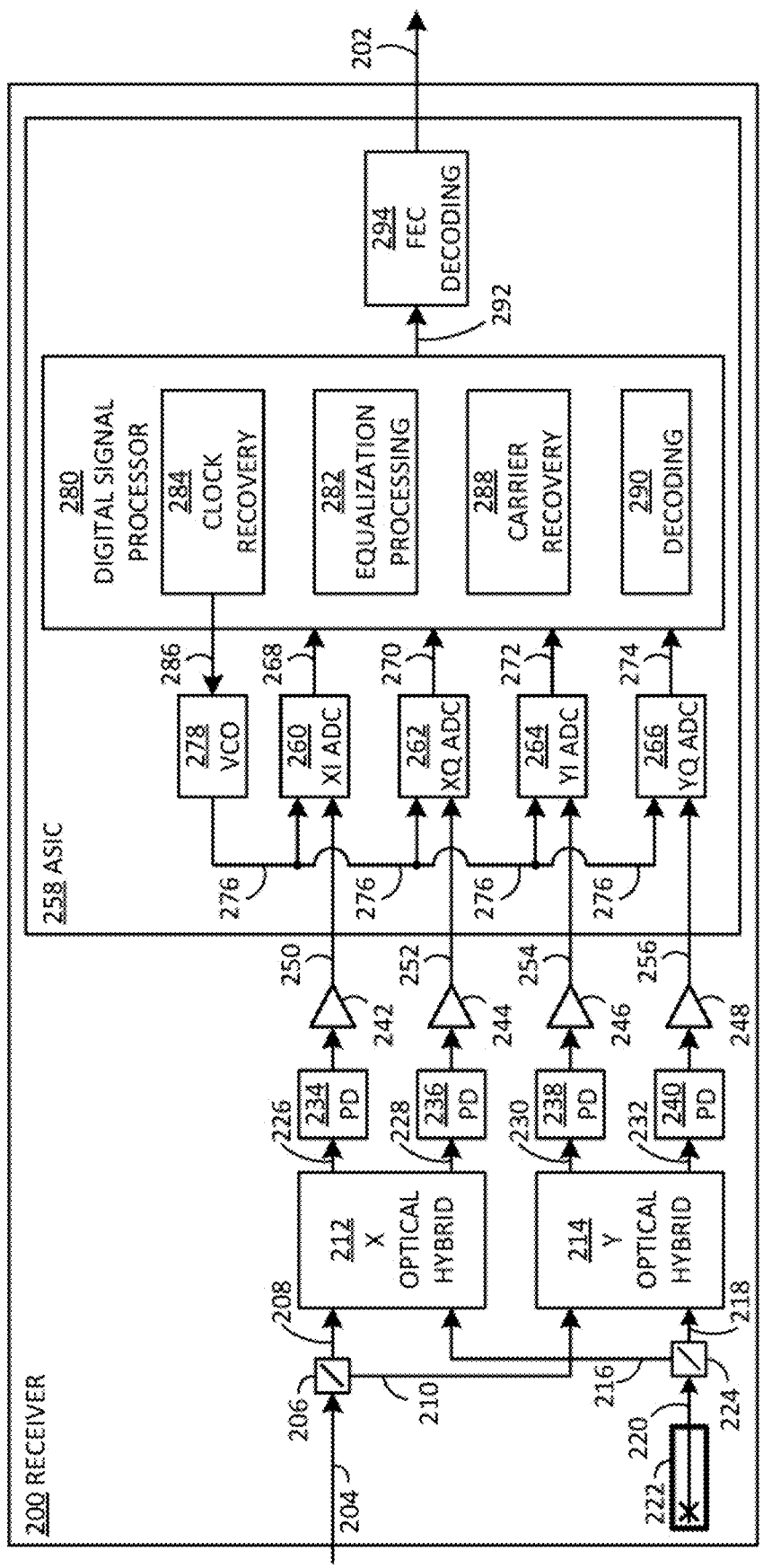
FIG. 2 illustrates an example receiver device in accordance some examples of the technology disclosed herein.

FIG. 2 illustrates an example receiver device 200, in accordance with some examples of the technology disclosed herein. The receiver device 200 is an example of the receiver device 104. The receiver device 200 may comprise additional components that are not described in this document.

The receiver device 200 is configured to receive an optical signal 204, which may comprise a degraded version of an optical signal generated by a transmitter device, such as the transmitter device 102. The optical signal generated by the transmitter device may be representative of information bits (also referred to as client bits) which are to be communicated to the receiver device 200. The optical signal generated by the transmitter device may be representative of a stream of symbols.

According to some examples, the transmitter device may be configured to apply forward error correction (FEC) encoding to the client bits to generate FEC-encoded bits, which may then be mapped to one or more streams of data symbols. The optical signal transmitted by the transmitter device may be generated using any of a variety of techniques such as polarization-division multiplexing (PDM), single polarization modulation, modulation of an unpolarized carrier, mode-division multiplexing, spatial-division multiplexing, Stokes-space modulation, polarization balanced modulation, and the like.

The receiver device 200 is configured to recover corrected client bits 202 from the received optical signal 204. The receiver device 200 may comprise a polarizing beam splitter 206 configured to split the received optical signal 204 into polarized components 208, 210, for example, orthogonally polarized components corresponding to an X polarization and a Y polarization, respectively. The receiver device 200 comprises optical hybrids 212, 214 configured to process the polarized components 208, 210 with respect to polarized components 216, 218 of a local optical signal 220 produced by a laser 222, where the local optical signal 220 is split into the polarized components 216, 218, for example, by a polarizing beam splitter 224. Where the optical hybrid 212 operates on the X polarization it may generate optical signals 226, 228 corresponding to dimensions XI, XQ, respectively, which denote the in-phase (I) and quadrature (Q) components of the X polarization. Where the optical hybrid 214 operates on the Y polarization it may generate optical signals 230, 232 corresponding to dimensions YI, YQ, respectively, which denote the I and Q components of the Y polarization. The optical signals 226, 228, 230, 232 may be converted by respective photodetectors 234, 236, 238, 240 into analog signals. Together, elements such as the beam splitters 206, 224, the laser 222, the optical hybrids 212, 214, and the photodetectors 234, 236, 238, 240 may form a communication interface configured to receive optical signals from other devices in a communication network, such as the network 100. The analog signals output by the photodetectors 234, 236, 238, 240 may be amplified by respective radiofrequency (RF) pre-amplifiers 242, 244, 246, 248, thereby resulting in respective amplified analog signals 250, 252, 254, 256.

The receiver device 200 may comprise an application specific integrated circuit (ASIC) 258. The ASIC 258 may comprise analog-to-digital converters (ADCs) 260, 262, 264, 266 which are configured to sample the analog signals 250, 252, 254, 256, and to generate respective digital signals 268, 270, 272, 274 corresponding to the dimensions XI, XQ, YI, YQ, respectively. Although illustrated as comprised in the ASIC 258, in an alternate implementation the ADCs 260, 262, 264, 266 or portions thereof may be separate from the ASIC 258. The ADCs 260, 262, 264, 266 may sample the analog signals 250, 252, 254, 256 periodically at a sample rate that is based on a signal 276 received from a voltage-controlled oscillator (VCO) 278.

The ASIC 258 may further comprise a digital signal processor (DSP) 280 configured to apply digital signal processing to the digital signals 268, 270, 272, 274. The DSP 280 may implement equalization processing 282 to compensate for a variety of channel impairments, such as CD, SOP rotation, PMD including group delay (GD) and differential group delay (DGD), PDL or PDG, and other effects. According to some examples, the equalization processing 282 may comprise the application of one or more equalizer filters, where each equalizer filter is characterized by compensation coefficients which may be incrementally updated from time to time, with the goal of generating an output signal that has less degradation than the respective input signal. According to some examples, the equalization processing 282 may comprise a static equalization operation which at least partially compensates for slowly changing channel impairments, such as CD. The static equalization operation may comprise the application of a filter that is characterized by compensation coefficients that may be calculated through firmware using the estimated CD during start-up of the receiver device (also referred to the acquisition stage). The compensation coefficients may be applied to received signals (either by convolution in the time domain, or by multiplication in the frequency domain), thereby resulting in processed signals which are, at least partially, compensated for CD. The term "static" is used to reflect the relatively infrequent updating of the compensation coefficients. The slow rate of change of the compensation coefficients means that the static equalization operation is only capable of tracking and compensating for relatively slow changes in the channel response, for example, rates on the order of <1 Hz. According to some examples, the equalization processing 282 may further comprise one or more dynamic equalization operations which at least partially compensate for faster changing channel impairments (for example, rates on the order of 100 kHz or more), such as SOP, PMD, PDL, and analog characteristics of the transmitter and receiver. Each dynamic equalization operation may comprise the application of a filter that is characterized by compensation coefficients that may be relatively frequently, as compared to the static equalization operation. Examples of the dynamic equalization operation include a Least Mean Squares (LMS) feedback loop, and a feedforward loop as described, for example, by Babaee et al. in U.S. Pat. No. 10,938,483, herein incorporated by reference in its entirety.

The digital signal processing implemented by the DSP 280 further comprises clock recovery 284, which will be described in more detail with respect to FIG. 3. According to some examples, the clock recovery 284 may be implemented by sending a feedback signal 286 to the VCO 278 based on phase offset measurements generated during the clock recovery 284. The feedback signal 286 may result in slight adjustments of the frequency of the VCO 278, which in turn will cause the signal 276 to make slight adjustments in the sample timing at the ADCs 260, 262, 264, 266. This feedback technique for clock recovery is commonly known as a phase lock loop (PLL). According to other examples, the clock recovery 284 may be implemented by using phase offset measurements to generate a phase shift in the signal 276 output by the VCO 278. This mechanism for clock recovery may be implemented using clock phase shifter hardware (not shown) that is known in the art. According to other examples, the clock recovery 284 may be implemented by using phase offset measurements to generate a phase shift in a downstream version of the digital signals 268, 270, 272, 274. This mechanism for clock recovery may be implemented using data phase shifter hardware (not shown) that is known in the art, either in the time domain or in the frequency domain.

The digital signal processing implemented by the DSP 282 may further comprise carrier recovery 288, which includes calculating an estimate of carrier frequency offset (CFO) (i.e., the difference between the frequency of the transmitter laser and the frequency of the receiver laser 222), and symbol-to-bit demapping (or decoding) 290 using a decision circuit, such that signals 292 output by the DSP 280 are representative of bit estimates. Where the received optical signal 204 is representative of symbols comprising FEC-encoded bits generated as a result of applying FEC encoding to client bits, the signals 292 may further undergo FEC decoding 294 to recover the corrected client bits 202.

For high-speed pluggable optical devices capable of optical communications at 60 Gbaud or higher, clock phase noise at the transmitter may be enhanced by ground noise and toned interference from power supplies. Tones (or spurs) are narrow-bandwidth signals with high power density, and may be generated internally from the analog components of a system, or may originate from an external source. For example, a switching power supply may inject tones into the phase noise at the frequency of the power supply (i.e., the fundamental frequency) and its harmonics (i.e., integer multiples of the fundamental frequency). In one example, the power supply may generate a fundamental tone at 2 MHz, and additional harmonic tones at integer multiples of 2 MHz, thereby resulting in multiple tones detectable up to, for example, 100 MHz. According to some examples, these pluggable devices may be used for line side optics or dense wavelength division multiplexing (DWDM) and also client side optics. One example is Quad Small Form Factor Pluggable Double Density (QSFP-DD) devices.

If not tracked by the receiver clock recovery, the enhanced clock phase noise may significantly degrade system performance, and hence the achievable reach. In addition, the receiver VCO may also have more ground noise and tones, so a higher bandwidth clock recovery may also help remove these receiver-based impairments.

Traditional techniques for clock recovery rely on timing detection after CD compensation, followed by the application of the timing correction using the VCO PLL which drives the ADCs (or a time-domain interpolator with a buffer). Due to the feedback loop delay(s), these traditional feedback techniques may suffer from bandwidth limitations on the order of 0.1/loop delay (Hz). Consequently, the bandwidth may not be sufficient to track the enhanced transmitter clock noise and the toned interference associated with pluggable optical devices, or to reject the noise and tones from the VCO phase noise.

It is of interest to have a clock recovery scheme that is very fast, thereby enabling the tracking of the bandwidth of the jitter timing that is being received from the transmitter. It is also of interest to have a clock recovery scheme that enables the tracking of toned interference that is coupled into the clock signal.

According to some examples, a clock recovery process is proposed wherein the traditional method of clock recovery, which is based on a feedback process, is combined with an anti-causal feedforward process, which may include the application of an infinite impulse response (IIR) filter. Given the anti-causal nature of the feedforward IIR filter (such that there is no delay in the timing estimate), it is possible to include a notch comb filter in the proposed clock recovery process, which may enable the elimination of harmonics of toned interference. The proposed clock recovery process may significantly increase the bandwidth of the clock recovery relative to the traditional feedback-based clock recovery method, which is associated with a large processing delay.

Figure 3:
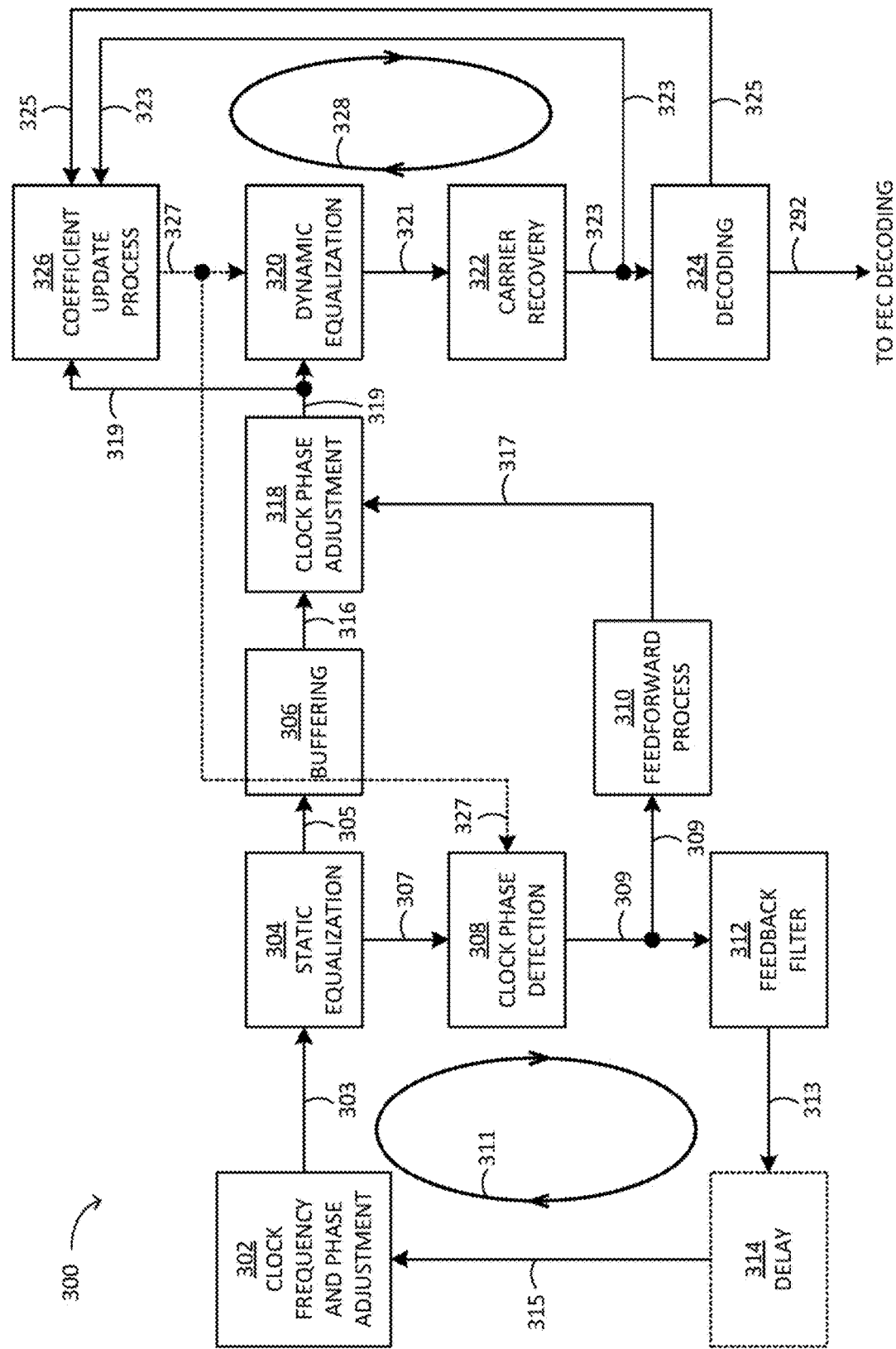
FIG. 3 illustrates a schematic showing digital signal processing performed at a receiver device in accordance with some examples of the technology disclosed herein.

FIG. 3 illustrates a schematic of example digital signal processing 300 performed at a receiver device. The digital signal processing 300 is an example of the processing implemented by the DSP 280 in FIG. 2.

Signals 303 are examples of the digital signals 268, 270, 272, 274 generated by the ADCs 260, 262, 264, 266. A static equalization operation 304 may be applied to signals 303, thereby resulting in respective compensated signals 305. As previously described, the static equalization operation 304 may involve the application of a filter characterized by compensation coefficients which have been calculated so as to at least partially compensate for residual CD in the signals 303. According to some examples, the static equalization operation 304 is performed in the frequency domain, but may alternatively be performed in the time domain.

The clock recovery process may include providing a subset 307 of the compensated signals 305 to a clock phase detection operation 308. In the context of clock recovery, phase detection is analogous to timing detection. The clock phase detection operation 308 may be designed such that it is robust to PDL, PMD, CFO, and laser phase noise. The clock phase detection operation 308 may be implemented, for example, as described by Sun et al. in U.S. Pat. No. 8,135,283, which is incorporated by reference herein in its entirety. According to some examples, the clock phase detection operation 308 may rely on compensation coefficients 327 applied by a dynamic equalization operation 320 performed further downstream in the digital signal processing 300, which will be described further below.

The clock phase detection operation 308 may generate signals 309 which represent an estimate of the clock phase offset (and thus the timing difference) between the receiver clock and the transmitter clock. The signals 309 may be input to a feedback filter 312 configured to track a very slow clock frequency difference to a mean of zero, for example, on the order of 40 parts per million in frequency units over a time window of 1 ms to 10 ms. According to some examples, the feedback filter 312 may comprise an IIR filter. According to one example, the feedback filter 312 may comprise a second-order proportional integral controller or first-order integral-only controller. The feedback filter 312 may generate first filtered signals 313 which represent a first phase offset estimate that may be used to adjust the timing of the signals 303 via a clock frequency and phase adjustment process 302. The clock frequency and phase adjustment process 302 is capable of performing adjustments over an infinite timing range, such that the first filtered signals 313 are capable of correcting for clock frequency offsets as well as clock phase offsets. However, the static equalization operation 304 may require a relatively large processing time, for example, on the order of 0.01 μs to 0.5 μs. As a result of this processing time, the clock frequency and phase adjustment process 302 is actually controlled by delayed versions of the first filtered signals 313. In FIG. 3, this is reflected by the application of a time delay 314 to the first filtered signals 313, thereby resulting in delayed signals 315. It is the delayed signals 315 that are used to control the clock frequency and phase adjustment process 302. According to one example, in the context of FIG. 2, the clock frequency and phase adjustment process 302 may be implemented by having the VCO 278 control the ADCs 260, 262, 264, 266 via the signal 276 as part of the VCO PLL. Thus far, what has been described is a feedback-based method of clock recovery, where the feedback path is denoted by 311. The signals 303 output by the clock frequency and phase adjustment process 302 may herein be referred to as first adjusted signals 303.

In order to implement frequency adjustment, the clock frequency and phase adjustment process 302 is configured to drive infinite phase adjustment. However, due to the reliance on the feedback filter 312 and the delay 314 incurred by the feedback path 311, there are limitations on the bandwidth achievable using this mechanism alone for clock recovery. For example, performing clock recovery using the clock frequency and phase adjustment process 302 alone may achieve a bandwidth on the order of 1 MHz.

Accordingly, a mechanism for enhanced clock recovery is herein proposed wherein the signals 309 generated by the clock phase detection operation 308 are input to a feedforward process 310. While the feedforward process 310 is being performed, the compensated signals 305 may undergo buffering 306, thereby resulting in respective buffered or delayed signals 316. As will be described further with respect to FIG. 5, the feedforward process 310 is configured to filter the signals 309 using a feedforward filter and optionally a notch comb filter, thereby resulting in second filtered signals 317 which represent a second phase offset estimate that may be used to adjust the clock phase of the signals 316 via a clock phase adjustment process 318. The buffering 306 may be used to delay the compensated signals 305 so that the feedforward process 310 is capable of using past, present, and future timing measurements, thereby optimizing performance of the feedforward filter described with respect to FIG. 5. According to some examples, the amount of buffering may be constrained, for example, based on power limitations or size limitations or both.

Based on the second filtered signals 317 generated by the feedforward process 310, a clock phase adjustment process 318 may be applied to the buffered signals 316, thereby resulting in second adjusted signals 319. Because a delay in the time domain is equivalent to a linear phase ramp in the frequency domain, the clock phase adjustment process 318 may be performed either in the time domain using interpolation or in the frequency domain with frequency-domain phase rotations, where the amount of phase rotation at a particular frequency is proportional to the product of the frequency value itself and the time estimate. The phase ramp may be described as $\exp(-j2\pi f\tau/F_S)$, where f denotes frequency, where $F_S$ denotes the sampling rate, and where $\tau$ denotes the time estimate normalized to the symbol period $T_S$.

According to some examples, a dynamic equalization operation 320 may be applied to the second adjusted signals 319, thereby resulting in equalized signals 321. According to some examples, the static equalization operation 320 may comprise a 2×2 multi-input multiple-output (MIMO) filter characterized by compensation coefficients that are configured to compensate for PDL and PMD in the signals 319. For example, the dynamic equalization operation 320 may apply compensation coefficients 327 that are periodically and incrementally adjusted using a coefficient update process 326. The equalized signals 321 may undergo a carrier recovery operation 322, thereby resulting in respective signals 323 which are compensated for laser frequency offset and linewidth. A decision circuit may then apply a decoding operation 324 to the signals 323 to recover symbol estimates 325 and corresponding bit estimates 292. The carrier recovery operation 322 and the decoding operation 324 are examples of the carrier recovery operation 288 and the decoding operation 290, respectively, as described with respect to FIG. 2. According to some examples, the decoding operation 324 may comprise soft decoding. The signals 292 may subsequently undergo FEC decoding, such as the FEC decoding 294 described with respect to FIG. 2.

According to some examples, the channel equalization 320 may employ a feedback loop 328 that is designed to minimize symbol decoding errors. For example, where the feedback loop 328 relies on LMS feedback, the coefficient update process 326 may generate coefficients 327 that are designed to minimize the LMS error on the symbols that are currently being decoded. For example, the coefficient update process 326 may comprise calculating an error signal based on a difference between the signals 323 and the signals 325, and calculating a cross-correlation between the error signal and the input signal 319. The coefficient update process 326 may comprise additional operations such as those described, for example, by Babaee et al. in U.S. Pat. No. 10,938,483.

The architecture of FIG. 3 may be advantageous for a number of reasons. As a result of the feedforward process 310, the second adjusted signals 319 have experienced enhanced clock recovery relative to the clock recovery experienced by the first adjusted signals 303. This enhancement may achieve a substantial increase in bandwidth, for example, on the order of at least a ten-fold improvement. Reducing the timing error on the signals 319 may improve the performance achieved by the channel equalization 320. Furthermore, because the channel equalization feedback loop 328 is independent from the clock recovery, system complexity may be minimized, and the signal delay caused by the buffering 306 does not impact the speed of adaptation of the channel equalization 320.

The clock phase detection operation 308 may be designed for implementation in either the over-sampled space (before the channel equalization 320) or the non-over-sampled space (after the channel equalization 320). Traditionally, clock phase detection may rely on an equalized signal, to remove the effects of CD, SOP, and PMD, such that the clock phase detection operation is often performed after channel equalization. However, this would involve nesting the loops 311 and 328 together, which may cause complications that may result in loss of performance. Moreover, the bandwidths of a LMS feedback loop and a clock recovery loop may differ significantly, for example, a LMS bandwidth may be in the range of hundreds of kHz, which a clock recovery bandwidth may go up to tens of MHz. For these reasons, it may be advantageous to implement the clock phase detection operation 308 before the channel equalization 320 (as illustrated in FIG. 3), such that the loops 311 and 328 are decoupled from one another, thereby permitting the loops to operate at different rates and without interacting with one another. This is possible because the static equalization 304 compensates for residual CD, and the clock phase detection operation 308 is designed to be resilient to SOP and PMD.

The signals 309 output by the clock phase detection operation 308 comprise phase noise contributed by the transmitter and the receiver, as well as noise originating from the clock phase detection operation 308 itself due to ASE and residual channel distortions.

Figure 4:
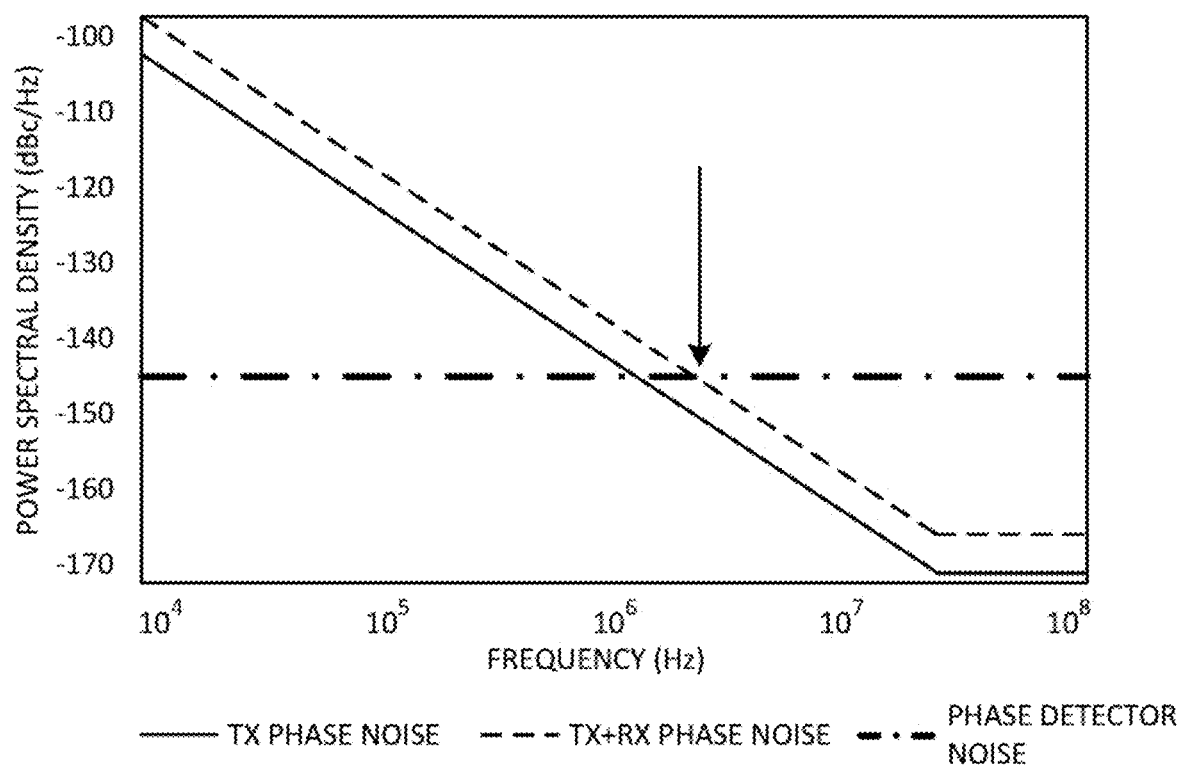
FIG. 4 illustrates an example plot of power spectral density as a function of frequency for phase noise originating from a transmitter, combined phase noise originating from a transmitter and a receiver, and noise originating from clock phase detection.

FIG. 4 illustrates an example plot of power spectral density as a function of frequency for phase noise originating from a transmitter and a receiver, as well as the additional phase noise introduced by a clock phase detection operation implemented at the receiver (such as the clock phase detection operation 308), where dBc denotes the power ratio of the phase noise relative to the carrier signal, and where the carrier signal has a frequency $F_c$=467.5 MHz. According to some examples, the feedforward process 310 may be configured to track the phase noise originating from the transmitter and the receiver (for clock recovery), while suppressing (as much as possible) the phase noise contributed by the clock phase detection operation. The arrow indicates an optimal bandwidth that may achieve this goal.

Figure 5:
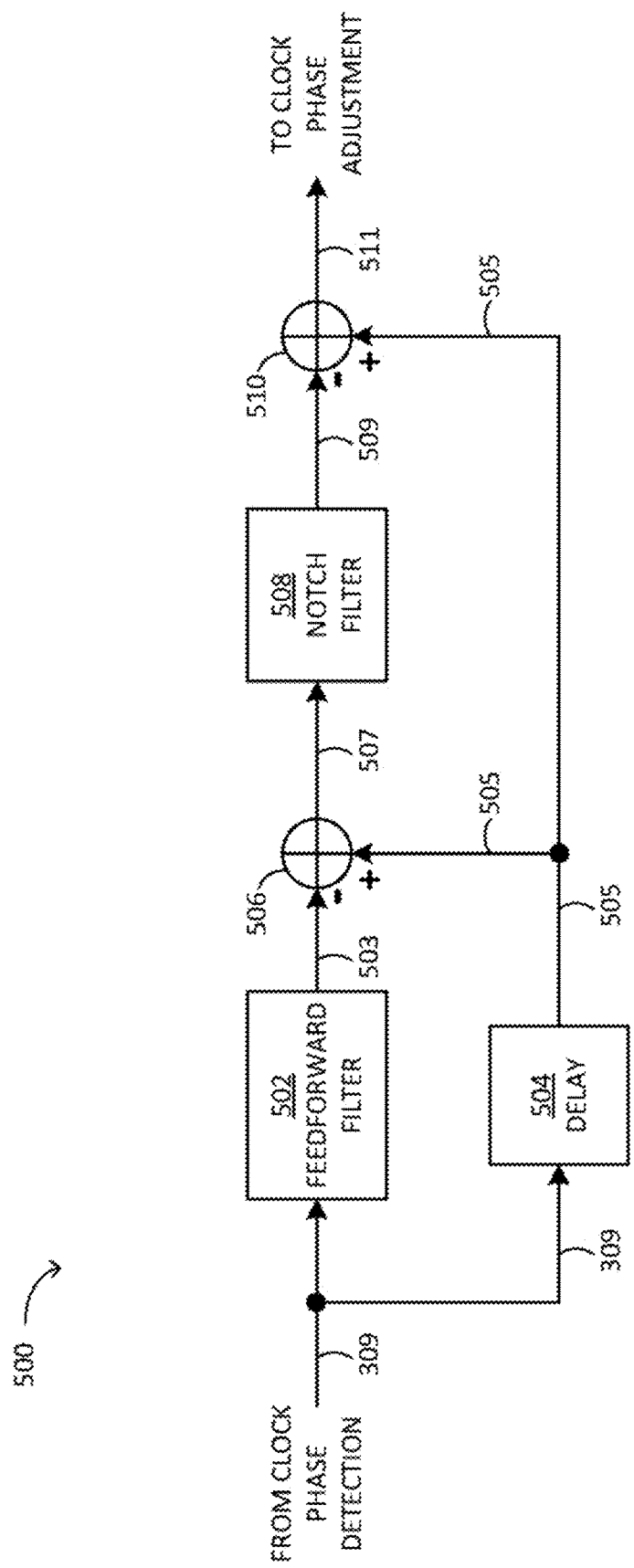
FIG. 5 illustrates a schematic showing feedforward processing performed at a receiver device in accordance with some examples of the technology disclosed herein.

FIG. 5 illustrates a schematic of an example feedforward process 500 performed at a receiver device. The feedforward process 500 is an example of the feedforward process 310 described with respect to FIG. 3.

A feedforward filter 502 may be applied to the signals 309, thereby resulting in respective filtered signals 503. The feedforward filter 502 may be designed to track the phase noise in the signals 309, while suppressing the phase detector noise. The phase noise has most of its power at low frequencies, for example, on the order of less than 10 MHz. Accordingly, the feedforward filter 502 may comprise a low-pass digital filter having a bandwidth sufficient to pass the phase noise from the transmitter and the receiver, while attenuating phase detector noise at higher frequencies. The feedforward filter 502 may be implemented as an IIR filter or a finite impulse response (FIR) filter. An BR filter may be advantageous since it may require less buffering of the data (and therefore less power) than a FIR filter.

In parallel to generating the filtered signals 503, a delay 504 may be applied to the signals 309, thereby resulting in delayed signals 505. The filtered signals 503 may be subtracted from the delayed signals 505 using a difference operation 506, thereby resulting in respective signals 507.

According to some examples, the Z transform of the feedforward filter 502 may be expressed as $$L(z) = \frac{(b + cz^{-1})}{1 - az^{-1}} \qquad [1]$$

where the parameters a, b, and c are finite real numbers that are programmable in firmware. According to one example, the feedforward filter L(z) may be configured as a first-order filter with c=0 and a=1−b. According to another example, the feedforward filter L(z) may be configured as a Bessel filter with c=b and a=1−2b.

The signals 503 are low-pass signals, while the signals 505 are all-pass signals. Accordingly, the signals 507 output by the difference operation 506 are high-pass signals, where the relationship between the signals 507 and the signals 309 may be expressed by the following transfer function $$G(z) = z^F - L(z) = z^F - \frac{(b + cz^{-1})}{1 - az^{-1}} \qquad [2]$$

where $z^F$ denotes the delay 504, and where F is an integer reflecting a number of clock cycles. For example, F=−1 corresponds to a delay of one clock cycle. Provided that F is a negative integer, the feedforward process 500 may be configured to operate in an anti-causal (or non-causal) manner.

According to some examples, the feedforward filter 502 may incorporate some FIR taps in addition to the IIR taps of the filter L(z) expressed in Equation 1. The additional FIR taps may provide a better approximation of a filter solution which minimizes the average square error, such as a minimum mean square error (MMSE) filter or a Wiener filter. In one example, the Z transform of the feedforward filter 502 may be expressed as $$L(z) = L_I(z) \cdot z^{-T} \cdot \left( \sum_{t=0}^{T} \alpha_t z^t \right) \qquad [3]$$

where $L_I(z)$ denotes an IIR response, such as that expressed in Equation 1, where T denotes the number of finite impulse taps, and where $\alpha_t$ denotes the tap coefficient. In one example, T=−F, meaning that the number of finite impulse taps is equal to the delay 504.

According to some examples, the feedforward filter 502 with F finite impulse taps may be expressed as $$L(z) := \frac{g}{1 - (1-g)z^{-1}} \cdot z^F \cdot \left( 1 + (1 - z^{-1}) \cdot \sum_{t=1}^{-F} z^t (1-g)^t \right) \qquad [4]$$

where g is a positive real number less than or equal to that controls the bandwidth of the filter L(z). The filter expressed in Equation 4 is configured to track clock source variations whose power spectral densities drop as $1/f^2$, where f denotes frequency.

According to some examples, a notch filter 508 may be applied to the signals 507, thereby resulting in respective signals 509. The notch filter 508, also referred to as a band-stop filter or band-reject filter, may comprise a comb filter configured to remove harmonics of interference caused by one or more tones. The Z transform of a notch filter, N(z), may be expressed as a function of a corresponding tone detection filter T(z), that is N(z)=1−T(z). While the feedforward filter 502 may be anti-causal, the notch filter 508 may be phase-matched with the data.

According to one example, detection of a single fundamental tone may be achieved using a tone detection filter $T_1$ having the following Z transform:

$$T_1(z) = \frac{(1 - (1 - \alpha))}{1 - (1 - \alpha)z^{-D}} \qquad [5]$$

where D is an integer which denotes a number of clock cycles of delay of an update clock of the tone detection filter, and where $\alpha$ is a positive real number satisfying $\alpha \ll 1$ which controls tone width.

In the frequency domain, the single-tone detection filter $T_1$ may be expressed as:

$$T_1\left(e^{-\frac{\omega}{f_s}}\right) = \frac{(1 - (1 - \alpha))}{1 - (1 - \alpha)e^{-\frac{\omega}{f_s}D}} \qquad [6]$$

where $\omega = 2\pi f$ denotes the angular frequency in radians per second. This filter may be capable of detecting all harmonics of a fundamental frequency $f_s/D$, where $f_s$ is a positive real number that denotes the update rate of the filter in Hz. In one example, $f_s$=254 MHz, and D=1, 2, . . . , 255. It may be shown that, for each frequency f satisfying $f = n \cdot f_s/D$, where n is a positive integer, the single-tone detection filter $T_1$ has magnitude of 1 and a phase of 0.

The Z transform of a notch filter $N_1$ configured to remove or suppress the harmonics of the fundamental frequency $f_s/D$ may be expressed as:

$$N_1(z) = 1 - T_1(z) = 1 - \frac{(1-(1-\alpha))}{1-(1-\alpha)z^{-D}} \quad [7]$$

It is also possible to configure a notch filter to remove multiple sets of tones. For example, detection of two sets of tones, may be achieved using a tone detection filter having the following Z transform:

$$T_2(z) = 1 - N_A(z)N_B(z) \quad [8]$$

$$\text{with } N_A(Z) = \left[1 - \frac{1-(1-\alpha_A)}{1-(1-\alpha_A)z^{-D_A}}\right]$$

$$\text{and with } N_B(Z) = \left[1 - \frac{1-(1-\alpha_B)}{1-(1-\alpha_B)z^{-D_B}}\right]$$

where $N_A$ is notch filter corresponding to a delay $D_A$ and a notch width $\alpha_A$, where $N_B$ is notch filter corresponding to a delay $D_B$ and a notch width $\alpha_B$, where $D_A$ and $D_B$ are integers satisfying $D_A \neq D_B$, and where $\alpha_A$ and $\alpha_B$ are positive real numbers satisfying $\alpha_A, \alpha_B <<1$. For example, the smaller the value of $\alpha_A$, the smaller the width of the tone detector (or the smaller the width of the notch filter $N_A$) centered on the harmonics of $f_s/D_A$. The tone detection filter $T_2(z)$ may be capable of detecting all harmonics of a first fundamental frequency $f_s/D_A$ and a second fundamental frequency $f_s/D_B$.

Referring to the example feedforward process 500, the notch filter 508 corresponding to the two-tone filter $T_2(z)$ is defined as $N_2(z)=1-T_2(z)$. When $N_2(z)$ is combined with the feedforward filter $L(z)$ expressed in Equation 1, the combination may be expressed as:

$$H(z) = (z^F - L(z)) \cdot (1 - N_A(z) \cdot N_B(z)) + L(z) \quad [9]$$

which may be simplified as follows:

$$H(z) = z^F - (z^F - L(z)) \cdot N_A(z) \cdot N_B(z) \quad [10]$$

The combined filter $H(z)$ is configured to remove or suppress two sets of tones comprising, for example, one set of tones originating from interference at the transmitter, and another set of tones originating from interference at the receiver.

FIGS. 6, 7, 8, and 9 illustrate plots of magnitude response and sensitivity response in dB as a function of frequency in MHz for four example feedforward processes. The sensitivity response of a filter $H(z)$ is defined as $1-H(z)$. The filter sampling rate is set at 254 MHz.

Figure 6:
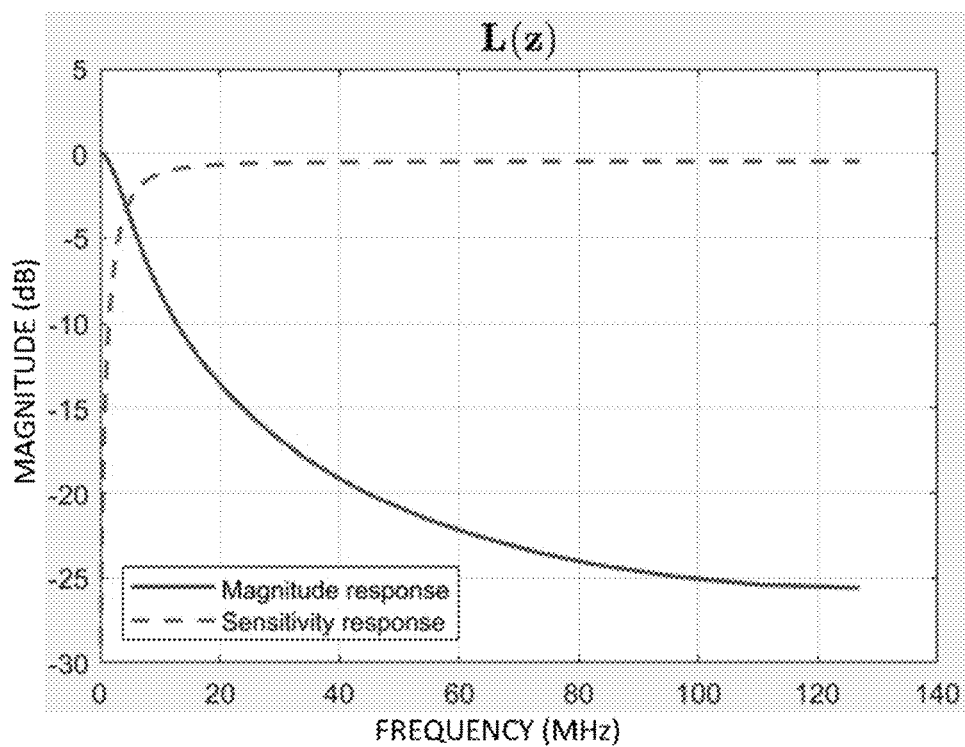
FIG. 6 illustrates a plot of magnitude and sensitivity response of an example feedforward filter.

FIG. 6 illustrates the magnitude and sensitivity responses for a filter $L(z)$ as expressed in Equation 1, where $L(z)$ is constructed as a first-order filter with a=0.99, b=0.01, and c=0.

Figure 7:
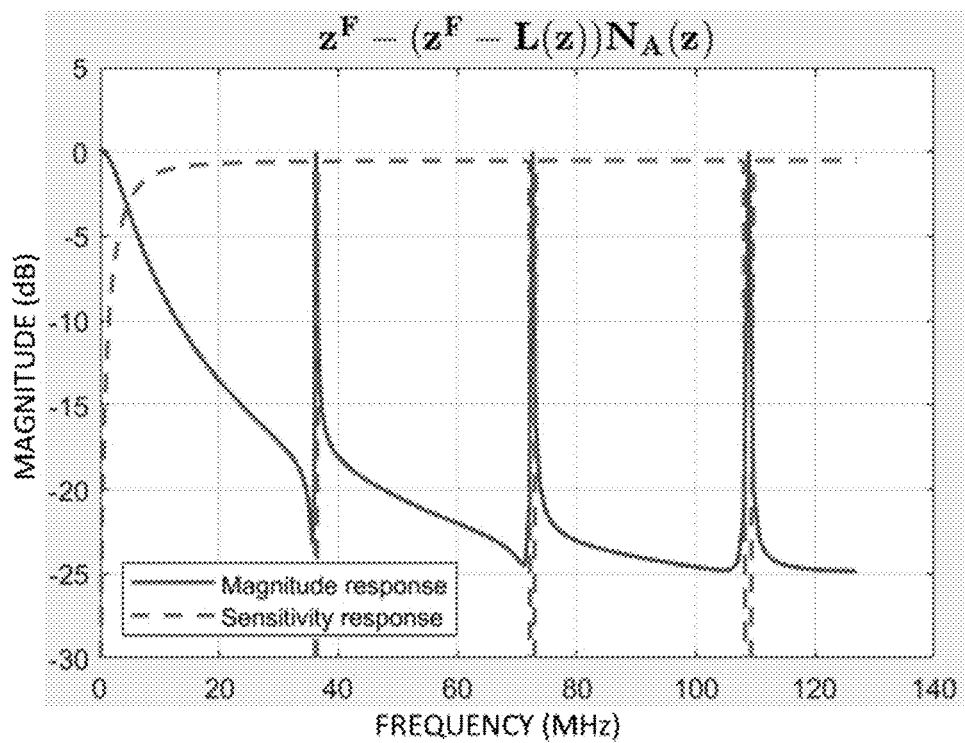
FIG. 7 illustrates a plot of magnitude and sensitivity response of the example feedforward filter of FIG. 6 in combination with a first example notch filter.

FIG. 7 illustrates the magnitude and sensitivity responses for a cascaded combination of the filter $L(z)$ of FIG. 6 and a single notch filter $N_A(z)$, with $D_A=7$, and with $\alpha_A=0.01$. Notably, the notches in the sensitivity response, which appear at integer multiples of 254 MHz/7=36.29 MHz, indicate that the phase noise at those frequencies will not be filtered, but rather tracked by the feedforward process.

Figure 8:
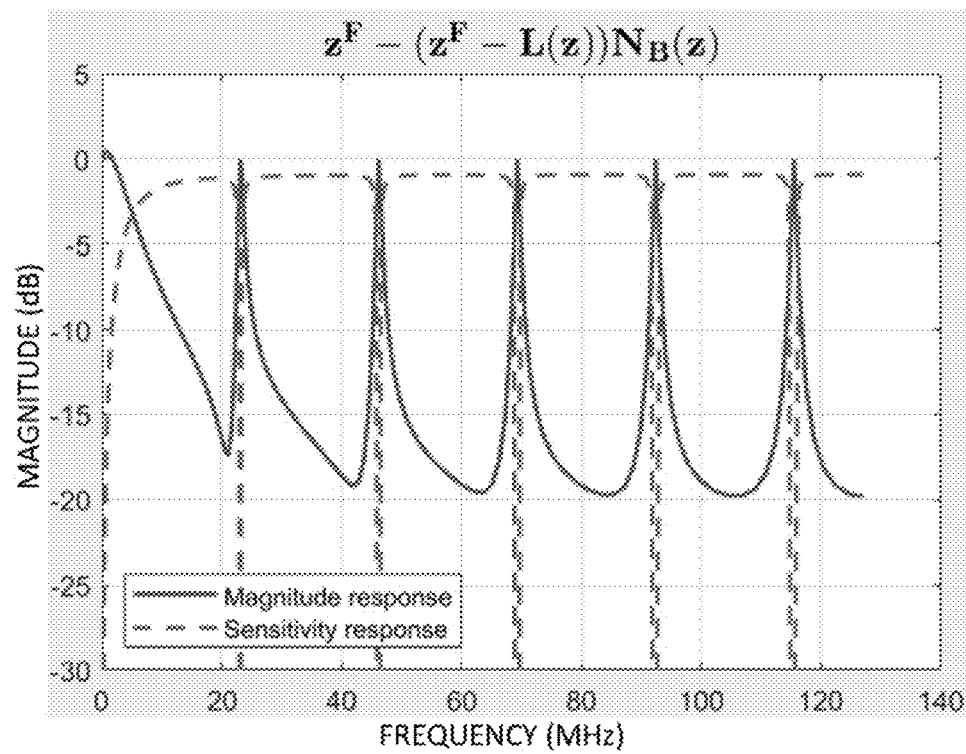
FIG. 8 illustrates a plot of magnitude and sensitivity response of the example feedforward filter of FIG. 6 in combination with a second example notch filter.

FIG. 8 illustrates the magnitude and sensitivity responses for a cascaded combination of the filter $L(z)$ of FIG. 6 and a single notch filter $N_B(z)$, with $D_B=11$, and with $\alpha_B=0.1$. In this case, the notches in the sensitivity response appear at integer multiples of 254 MHz/11=23.09 MHz. A comparison of FIG. 8 to FIG. 7 demonstrates the larger notch width as a result of the higher value of $\alpha_B$ relative to $\alpha_A$.

Figure 9:
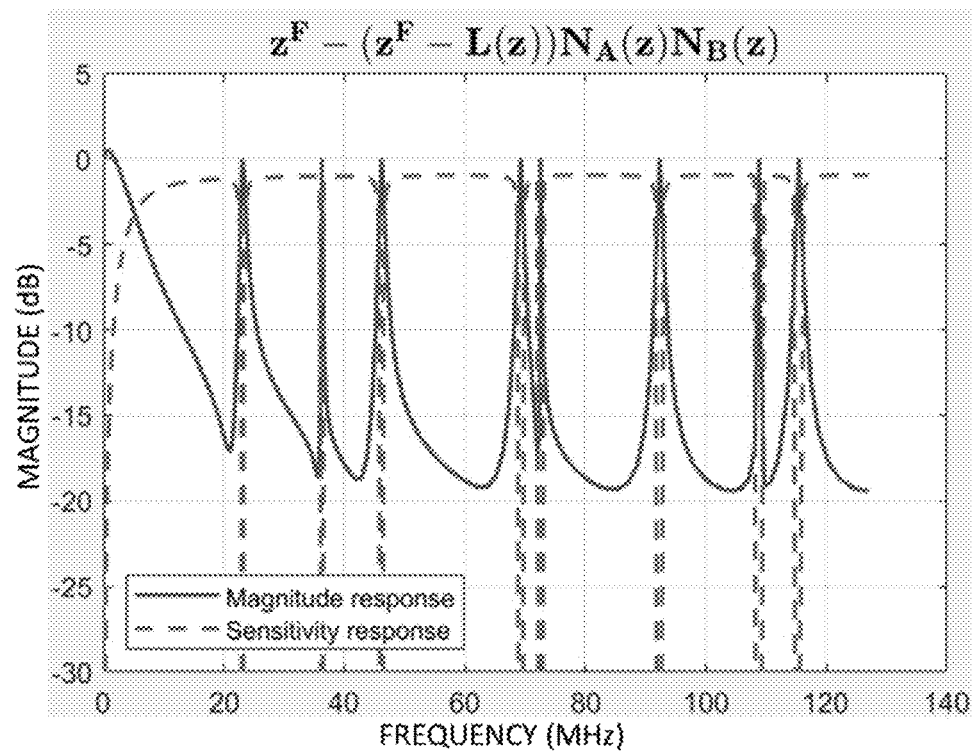
FIG. 9 illustrates a plot of magnitude and sensitivity response of the example feedforward filter of FIG. 6 in combination with the first example notch filter of FIG. 7 and the second example notch filter of FIG. 8.

FIG. 9 illustrates the magnitude and sensitivity responses for a cascaded combination of the filter $L(z)$ of FIG. 6 and a two-tone notch filter defined by $N_A(z)$ and $N_B(z)$ as described with respect to FIGS. 7 and 8, respectively. That is, FIG. 9 illustrates the responses of the combined filter $H(z)$ as expressed in Equation 8, where $L(z)$ is expressed in Equation 1 with a=0.99, b=0.01, and c=0, and where $N_A(z)$ and $N_B(z)$ are expressed in Equation 6, with $D_A=7$, $\alpha_A=0.01$, $D_B=11$, and $\alpha_B=0.1$. Following this logic, the feedforward filter $L(z)$ may be cascaded with additional notch filters, as desired.

Returning to FIG. 5, the signals 509 generated by the notch filter 508 may be subtracted from the delayed signals 505 using a difference operation 510, thereby resulting in signals 511. The signals 511 are examples of the signals 317 that are provided to the clock phase adjustment process 318.

According to other examples, the notch filter 508 may be disabled or bypassed, such that the signals 507 (rather than the signals 511) are provided to the clock phase adjustment process 318. For example, where the notch filter 508 is the two-tone filter $N(z)$, the bypass may be achieved by setting $\alpha_A = \alpha_B = 0$, such that $N_A(z) = N_B(z) = 1$, thereby resulting in $H(z) = L(z)$.

The buffering 306 described with respect to FIG. 3 may be configured to match a timing delay associated with the combination of the clock phase detection operation 308 and the feedforward process 310. For example, the buffering 306 may include not only a delay equivalent to the processing time incurred by the clock phase detection operation 308, but an additional delay equivalent to the delay 504, such that the buffered signals 316 coincide in time with the signals 317 output by the feedforward process 310. According to one example, the feedforward filter may comprise an N-tap FIR filter, and the buffering 306 may add N/2 clock cycles of buffer to the data. A delay of N/2 is selected because the linear phase FIR filter is symmetrical. The buffering of an additional N/2 clock cycles means that the FIR filtering process is done by processing a current sample with N/2 past samples, along with N/2 future samples.

Figure 10:
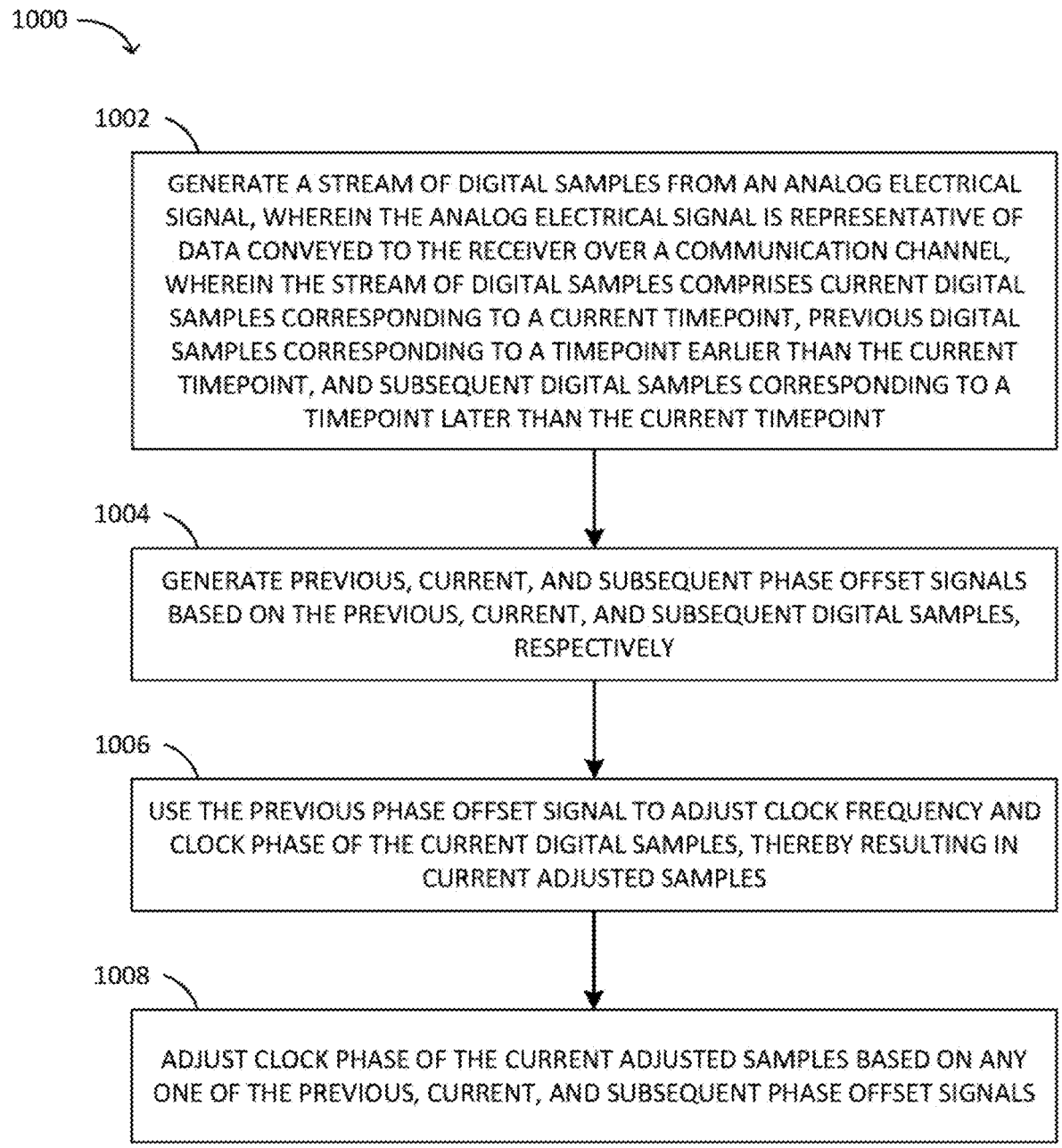
FIG. 10 illustrates a method for clock recovery in accordance with some examples of the technology disclosed herein.

FIG. 10 illustrates an example method 1000 for anti-causal clock recovery. The method 1000 may be performed at a receiver device, such as the receiver device 200.

At 1002, the receiver may generate a stream of digital samples from an analog electrical signal, where the analog electrical signal is representative of data conveyed to the receiver over a communication channel. For example, the analog electrical signal may comprise any of the signals 250, 252, 254, 256, and the digital samples may comprise any of the signals 268, 270, 272, 274 (or 303). The conversion of the analog electrical signal to a respective stream of digital samples is implemented by an ADC, such as any one of the ADCs 260, 262, 264, 266. To facilitate an understanding of the feedback and feedforward processes performed as part of the clock recovery method 1000, the stream of digital samples may be understood as comprising "current" digital samples corresponding to a current timepoint, "previous" digital samples corresponding to a timepoint earlier than the current timepoint, and "subsequent" digital samples corresponding to a timepoint later than the current timepoint. The descriptors "current", "previous", and "subsequent" are used merely to relate the digital samples to one another in time.

According to some examples, the receiver may generate compensated samples from the digital samples generated at 1002, where the compensated samples are at least partially compensated for CD in the communication channel. For example, the receiver may apply the static equalization operation 304 to the digital signals, thereby generating compensated samples 305. From the previous, current, and subsequent digital samples generated at 1002, the receiver may generate respective previous, current, and subsequent compensated samples, respectively. In the event that fiber dispersion is zero, the application of CD compensation may be unnecessary. For example, the static equalization operation 304 may be omitted in the case that the digital samples generated 1002 are already substantially compensated for residual CD in the communication channel.

At 1004, the receiver may generate previous, current, and subsequent phase offset signals based on the previous, current, and subsequent digital samples, respectively, generated at 1002. In the event that the digital samples have undergone CD compensation, thereby resulting in respective compensated samples, the phase offset signals may be generated using the compensated samples. For example, the receiver may apply the clock phase detection operation 308 to a subset 307 of the compensated samples 305, thereby resulting in the phase offset signal 309.

At 1006, the receiver may use the previous phase offset signal generated at 1004 to adjust clock frequency and clock phase of the current digital samples, thereby resulting in current adjusted samples. For example, as described with respect to the feedback loop 311, a phase offset signal 309 associated with a given timepoint may be used by the clock frequency and phase adjustment operation 302 to adjust frequency and phase of the digital signal 303 at a later timepoint. Thus, the previous phase offset signal may be used to adjust frequency and phase of the current digital samples (or current compensated samples), and/or the current phase offset signal may be used to adjust frequency and phase of the subsequent digital samples (or subsequent compensated samples).

At 1008, the receiver may adjust clock phase of the current adjusted samples based on any one of the phase offset signals generated at 1004. That is, in addition to adjusting the current digital samples (or current compensated samples) using the previous phase offset signal (e.g., according to the feedback loop 311, which is necessarily a causal process), the receiver may apply an additional clock phase adjustment to the current adjusted samples, where this additional clock phase adjustment may be causal or anti-causal. For example, the receiver may apply the feedforward process 310 to the phase offset signal 309, and then may apply the clock phase adjustment operation 318 to the delayed compensated signals 316 based on the signal 317 generated by the feedforward process 310. In the event that the clock phase adjustment performed at 1008 is performed in a causal manner, the clock phase of the current digital samples may be adjusted based on either the previous phase offset signal or the current phase offset signal. In the event that the clock phase adjustment performed at 1008 is performed in an anti-causal manner, the clock phase of the current digital samples may be adjusted based on the subsequent phase offset signal.

According to some examples, the method 1000 may further comprise the receiver suppressing tones in the phase offset signals prior to using the phase offset signals to adjust the clock phase of the digital samples (or compensated samples) at 1008, where the tones are associated with one or more fundamental frequencies. For example, the phase offset signals may comprise first tones originating from the receiver at one fundamental frequency, and the phase offset signals may further comprise second tones originating from outside the receiver at another fundamental frequency.

According to some examples, the method 1000 may further comprise applying a lowpass filter, such as the feedforward filter 501, to the phase offset signals to generate filtered phase offset signals, such as the signals 503. The method 1000 may further comprise calculating a first difference signal by subtracting one of the filtered phase offset signals from one of the phase offset signals, for example, using the difference operation 506 to generate the difference signal 507 from the signals 503 and 505. The method 1000 may further comprise adjusting the clock phase of the digital samples (or compensated samples) based on the first difference signal. According to one example, the lowpass filter is applied to the current phase offset signal to generate a filtered current phase offset signal; the first difference signal is calculated by subtracting the filtered current phase offset signal from the previous phase offset signal; and the clock phase of the previous digital samples (or previous compensated samples) is adjusted based on the first difference signal.

According to some examples, the method 1000 may further comprise applying a notch filter to first difference signal, thereby generating a notched difference signal; calculating a second difference signal by subtracting the notched difference signal from the one of the phase offset signals; and adjusting the clock phase of the digital samples (or compensated samples) based on the second difference signal. For example, the notch filter 508 may be applied to the first difference signal 507, thereby generating the notched difference signal 509, the second difference signal may be calculated by subtracting the notched difference signal 509 from the phase offset signal 505, for example using the difference operation 510, thereby resulting in the second difference signal 511, and the clock phase adjustment 318 may adjust the clock phase of the delayed compensated samples 316 based on the second difference signal 511.

According to some examples, notch filter may comprise a comb filter configured to suppress harmonics of one or more fundamental frequencies.

According to some examples, the method 1000 may further comprise buffering the digital samples (or compensated samples) for a period of time prior to adjusting their clock phase. For example, previous compensated samples may be delayed by the buffering 306 for a period of time prior to adjusting their clock phase based on the current phase offset signal. According to some examples, the period of time may be configured to match a sum of a first time delay associated with generating the current phase offset signal based on the current digital samples (or compensated samples), for example, the time delay associated with the clock phase detection operation 308, and a second time delay associated with the feedforward process 310, 500 (i.e., including at least the time delay associated with the application of the lowpass filter 502 to the current phase offset signal 309, and, in the event it is used, the additional time delay associated with the application of the notch filter 508).

Figure 11:
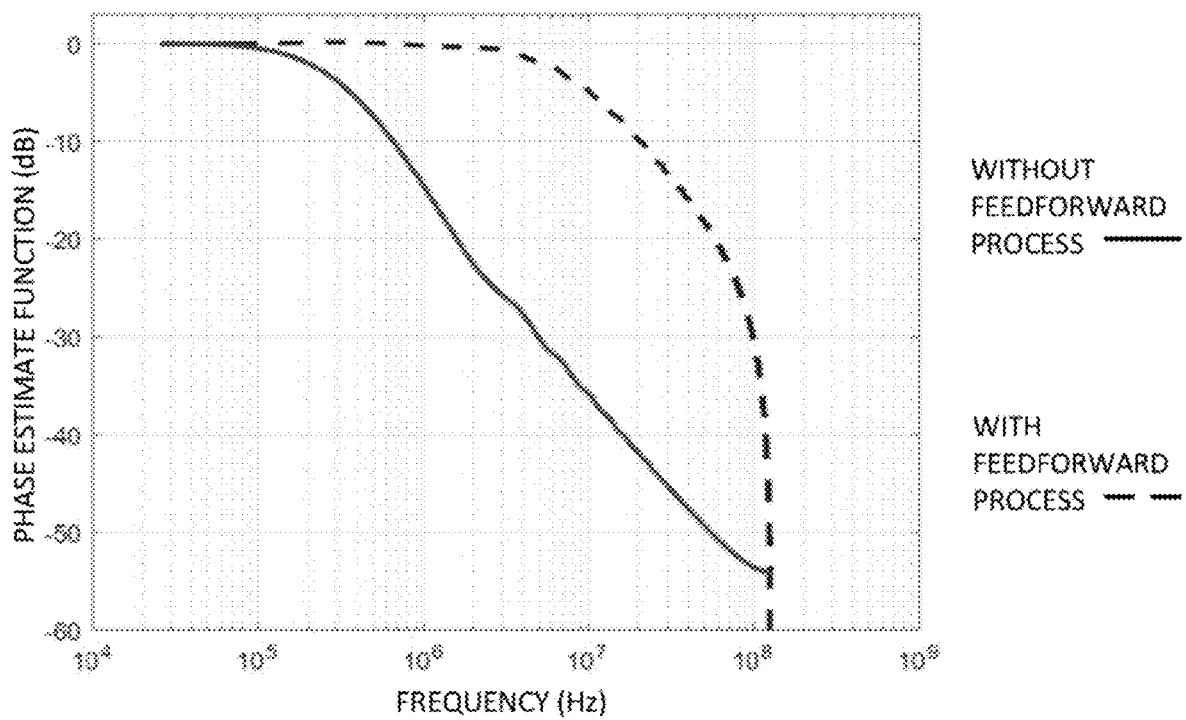
FIG. 11 illustrates a plot of amplitude as a function of frequency of a phase estimate function associated with clock recovery performed with and without a feedforward process in accordance with some examples of the technology disclosed herein.
Figure 12:
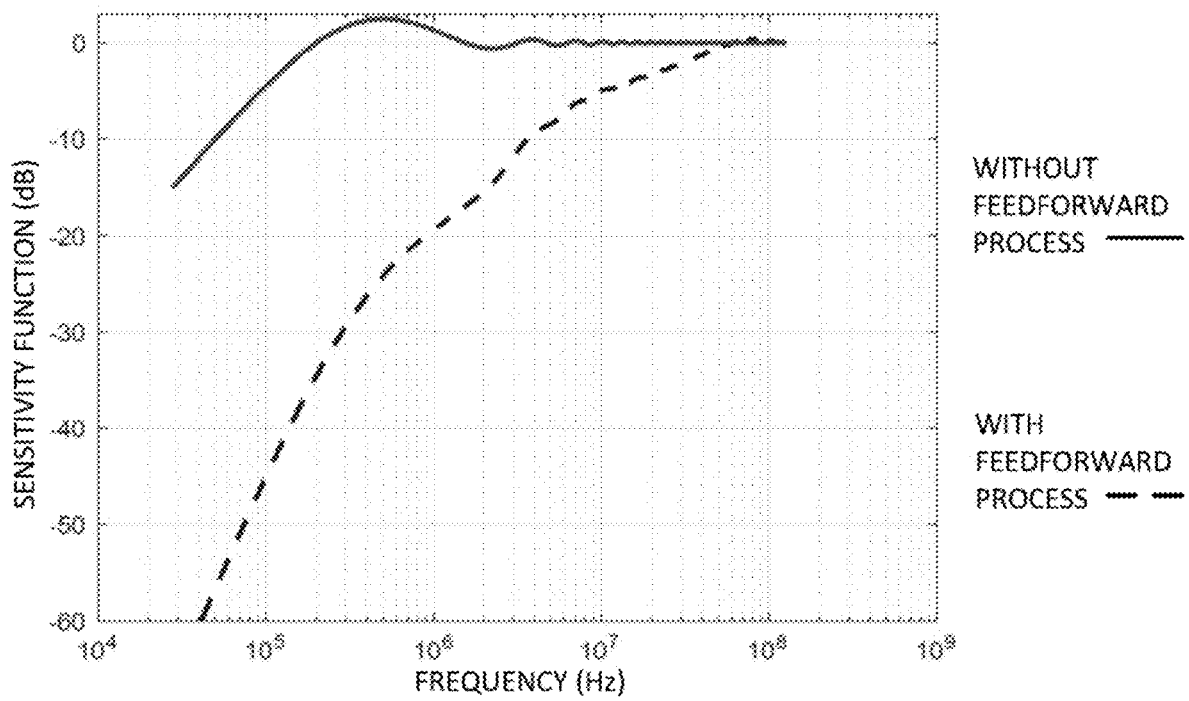
FIG. 12 illustrates a plot of amplitude as a function of frequency of a phase sensitivity function associated with clock recovery performed with and a feedforward process in accordance with some examples of the technology disclosed herein.

The experimental results shown in FIGS. 11 and 12 demonstrate the clock recovery achieved using a combination of a feedback process and a feedforward process as described herein, relative to the feedback process alone. The feedforward process was implemented using a first-order Bessel filter operating in an anti-causal manner with a delay of one clock cycle. Notch filtering was disabled.

FIG. 11 illustrates an example plot of amplitude in dB as a function of frequency in Hz of a clock phase estimate function associated with clock recovery performed without the feedforward process (solid line) and with the feedforward process (dashed line). That is, the solid line represents the transfer function of the feedback filter 312, while the dashed line represents a combined response of the both the feedback filter 312 and the feedforward process 310. The two curves represent the amount of signal attenuation at a given frequency. Both clock phase estimate functions are low-pass filters whose respective bandwidths determine the range of frequencies over which the clock phase noise is tracked. A comparison of the two curves indicates that, for a given amplitude, such as −10 dB, there is a significant increase in the bandwidth achievable when clock recovery is performed using the combined feedback/feedforward architecture, relative to the feedback process alone. Without the feedforward process, the bandwidth of the clock phase estimate function is limited due to the loop delay of the feedback loop 311, which is typically less than 1 MHz. With the feedforward process, the bandwidth of the clock phase estimate function may expand to 50 MHz, although the bandwidth for optimum clock phase estimation performance may be on the order of 10 MHz.

FIG. 12 illustrates an example plot of amplitude in dB as a function of frequency in Hz of a clock phase sensitivity function associated with clock recovery performed without the feedforward process (solid line) and with the feedforward process (dashed line). While the clock phase estimate functions in FIG. 11 are low-pass filters, the clock phase sensitivity functions in FIG. 12 are high-pass filters whose respective bandwidths determine how much of the noise/interference originating from the clock phase detection operation 308 is rejected. The higher in frequency the rejection, the better the clock phase estimate function is in reducing noise/interference on the measurement. The combination of the feedback process and the feedforward process may be designed such that the bandwidth of the clock phase sensitivity function passes as much clock phase noise as possible while rejecting as much clock phase detection noise as possible. For example, a clock recovery architecture such as the one illustrated in FIG. 3 may be designed to have a bandwidth of approximately 3 MHz, such that the feedforward process tracks the clock phase noise components under 3 MHz while rejecting the clock phase noise components from 3 MHz to 200 MHz (which predominantly originate from phase detector noise).

The techniques described herein may be used for enhanced clock recovery. The inclusion of the feedforward process may increase the bandwidth for clock recovery relative to traditional feedback-only clock recovery methods. For example, the bandwidth for clock phase tracking may be increased by up to 50 MHz by including a first-order feedforward process in the clock recovery architecture. In some examples, the feedforward process may be implemented in an anti-causal manner, thereby further enhancing the clock recovery by improving clock phase estimation accuracy. For example, the accuracy of the clock phase estimation may be improved using one or two non-causal taps. In some examples, clock phase estimation accuracy may be further improved by linearizing the phase response of the feedforward filter by incorporating FIR taps to better approximate a MMSE filter or a Wiener filter. In some examples, the feedforward process may optionally include tone suppression, which may provide improved clock phase estimation accuracy in the event that the clock phase noise contains tones at discrete frequencies.

The scope of the claims should not be limited by the details set forth in the examples, but should be given the broadest interpretation consistent with the description as a whole.

What is claimed is:

1. A receiver apparatus comprising:
   circuitry configured to generate a stream of digital samples from an analog electrical signal, wherein the analog electrical signal is representative of data conveyed to the receiver apparatus over a communication channel, wherein the stream of digital samples comprises current digital samples corresponding to a current timepoint, previous digital samples corresponding to a timepoint earlier than the current timepoint, and subsequent digital samples corresponding to a timepoint later than the current timepoint;
   circuitry configured to generate previous, current, and subsequent phase offset signals based on the previous, current, and subsequent digital samples, respectively;
   circuitry configured to use the previous phase offset signal to adjust clock frequency and clock phase of the current digital samples, thereby resulting in current adjusted samples; and
   circuitry configured to adjust clock phase of the current adjusted samples based on any one of the previous, current, and subsequent phase offset signals.

2. The receiver apparatus as claimed in claim 1, wherein the timing of the current adjusted samples is adjusted based on the subsequent phase offset signal.

3. The receiver apparatus as claimed in claim 1, further comprising
   circuitry configured to generate previous, current, and subsequent compensated samples from the previous, current, and subsequent digital samples, respectively, wherein the previous, current, and subsequent compensated samples are at least partially compensated for chromatic dispersion in the communication channel, and wherein the previous, current, and subsequent phase offset signals are generated using the previous, current, and subsequent compensated samples, respectively.

4. The receiver apparatus as claimed in claim 1, further comprising
   circuitry configured to suppress tones in the current phase offset signal prior to using the current phase offset signal to adjust the phase of the previous digital samples, wherein the tones are associated with one or more fundamental frequencies.

5. The receiver apparatus as claimed in claim 4, wherein the current phase offset signal comprises first tones originating from the receiver at one of the fundamental frequencies, and wherein the current phase offset signal comprises second tones originating from outside the receiver at another one of the fundamental frequencies.

6. The receiver apparatus as claimed in claim 1, further comprising
   circuitry configured to apply a lowpass filter to the current phase offset signal to generate a filtered current phase offset signal;
   circuitry configured to calculate a first difference signal by subtracting the filtered current phase offset signal from the previous phase offset signal; and
   circuitry configured to adjust the clock phase of the previous digital samples based on the first difference signal.

7. The receiver apparatus as claimed in claim 5, further comprising
   circuitry configured to apply a notch filter to the first difference signal, thereby generating a notched difference signal;
   circuitry configured to calculate a second difference signal by subtracting the notched difference signal from the previous phase offset signal; and
   circuitry configured to adjust the clock phase of the previous digital samples based on the second difference signal.

8. The receiver apparatus as claimed in claim 7, wherein the notch filter comprises a comb filter configured to suppress harmonics of one or more fundamental frequencies.

9. The receiver apparatus as claimed in claim 1, further comprising
circuitry configured to buffer the previous digital samples for a period of time prior to adjusting the clock phase of the previous digital samples based on the current phase offset signal.

10. The receiver apparatus as claimed in claim 9, wherein the period of time matches a sum of a first time delay associated with generating the current phase offset signal based on the current digital samples, and a second time delay associated with applying a lowpass filter to the current phase offset signal.

11. A method comprising:
generating a stream of digital samples from an analog electrical signal, wherein the analog electrical signal is representative of data conveyed to a receiver apparatus over a communication channel, wherein the stream of digital samples comprises current digital samples corresponding to a current timepoint, previous digital samples corresponding to a timepoint earlier than the current timepoint, and subsequent digital samples corresponding to a timepoint later than the current timepoint;
generating previous, current, and subsequent phase offset signals based on the previous, current, and subsequent digital samples, respectively;
using the previous phase offset signal to adjust clock frequency and clock phase of the current digital samples, thereby resulting in current adjusted samples; and
adjusting clock phase of the current adjusted samples based on any one of the previous, current, and subsequent phase offset signals.

12. The method as claimed in claim 11, wherein the clock phase of the current adjusted samples is adjusted based on the subsequent phase offset signal.

13. The method as claimed in claim 11, further comprising
generating previous, current, and subsequent compensated samples from the previous, current, and subsequent digital samples, respectively, wherein the previous, current, and subsequent compensated samples are at least partially compensated for chromatic dispersion in the communication channel, and wherein the previous, current, and subsequent phase offset signals are generated using the previous, current, and subsequent compensated samples, respectively.

14. The method as claimed in claim 11, further comprising suppressing tones in the current phase offset signal prior to using the current phase offset signal to adjust the clock phase of the previous digital samples, wherein the tones are associated with one or more fundamental frequencies.

15. The method as claimed in claim 14, wherein the current phase offset signal comprises first tones originating from the receiver at one of the fundamental frequencies, and wherein the current phase offset signal comprises second tones originating from outside the receiver at another one of the fundamental frequencies.

16. The method as claimed in claim 11, further comprising
applying a lowpass filter to the current phase offset signal to generate a filtered current phase offset signal;
calculating a first difference signal by subtracting the filtered current phase offset signal from the previous phase offset signal; and
adjusting the clock phase of the previous digital samples based on the first difference signal.

17. The method as claimed in claim 15, further comprising
applying a notch filter to the first difference signal, thereby generating a notched difference signal;
calculating a second difference signal by subtracting the notched difference signal from the previous phase offset signal; and
adjusting the clock phase of the previous digital samples based on the second difference signal.

18. The method as claimed in claim 17, wherein the notch filter comprises a comb filter configured to suppress harmonics of one or more fundamental frequencies.

19. The method as claimed in claim 11, further comprising
buffering the previous digital samples for a period of time prior to adjusting the clock phase of the previous digital samples based on the current phase offset signal.

20. The method as claimed in claim 19, wherein the period of time matches a sum of a first time delay associated with generating the current phase offset signal based on the current digital samples, and a second time delay associated with applying a lowpass filter to the current phase offset signal.

* * * * *